United States Patent [19]
Appleby et al.

[11] 3,929,637
[45] Dec. 30, 1975

[54] DEODORIZING PROCESS
[75] Inventors: Albert E. Appleby; Tommy G. Simpson, both of Orangeburg, S.C.
[73] Assignee: Ethyl Corporation, Richmond, Va.
[22] Filed: July 25, 1973
[21] Appl. No.: 382,495

[52] U.S. Cl. .................................. 210/63; 21/55
[51] Int. Cl.² ............................................ C02B 1/34
[58] Field of Search ............. 21/55; 210/50, 52, 53, 210/59, 63, 64; 260/543 P

[56]         References Cited
         UNITED STATES PATENTS
3,149,137   9/1964   Huffman et al. ................. 260/543 P
3,413,218   11/1968  Einsel ............................... 210/18
3,583,909   6/1971   Block ................................ 210/53

OTHER PUBLICATIONS
Humphrey et al., "Taste and Odor Control Using KMnO₄," Reprinted from 1962 Water and Sewage Works.
Sisley, J. P., Encyclopedia of Surface Active Agents, Vol. II, pp. 46–49.
Ficek, "Potassium Permanganate for Cleaner Air and Water," Reprinted from Paint & Varnish Prod. May 1973.
King et al., "Polytertiary Phosphines and Arsines," Journal of the American Chemical Society, 8-25-71, pp. 4158–4166.

*Primary Examiner*—Thomas G. Wyse
*Assistant Examiner*—Peter A. Hruskoci
*Attorney, Agent, or Firm*—Donald L. Johnson; Robert A. Linn

[57]         ABSTRACT

A method is disclosed for treating residue from the preparation of organophosphorus compounds of the general formula $$R_y P(L)_z X_{3-y} \qquad (1)$$

wherein R is substantially hydrocarbyl, L is sulfur or oxygen, X is halogen, $z$ is 0 or 1, and $y$ is 1 or 2. The treatment deodorizes and facilitates disposal of this residue.

15 Claims, No Drawings

DEODORIZING PROCESS

BACKGROUND OF THE INVENTION

Methods are known for preparing organophosphorus halides such as the alkyl or aryl phosphine halides and alkyl or aryl phosphonyl and thiophosphonyl halides. Commonly used methods of preparing these compounds involve the reaction of phosphorus halide or thio halide, e.g., $PCl_3$, $PSCl_3$, with (a) a hydrocarbon or halohydrocarbon and aluminum halide catalyst, or (b) alkyl or aryl aluminum or mercury compound. On recovering the desired organophosphorus halides from such reactions, a malodorous residue remains. This residue requires disposal.

A novel method has been discovered for treating this residue so that the odor is substantially reduced and handling and disposal are facilitated.

SUMMARY OF THE INVENTION

A method for treating residue from the preparation or organophosphorus halides having the general formula $R_yP(L)_zX_{3-y}$, wherein R is substantially hydrocarbyl, L is sulfur or oxygen, X is halogen, z is 0 or 1, and y is 1 or 2, by hydrolyzing the residue in an aqueous detergent dispersion and then neutralizing the hydrolysate with a base and an inorganic oxidizing agent.

DESCRIPTION OF THE PREFERRED EMBODIMENTS

The present invention is embodied in a method for deodorizing residue from the preparation of organophosphorus compounds having the formula $R_yP(L)_zX_{3-y}$, wherein R is substantially hydrocarbyl, L is S or O, X is halogen, y is 1 or 2 and z is 0 or 1, which comprises
1. hydrolyzing said residue with water containing surfactant and
2. treating the hydrolysate from (1) with a base and an inorganic oxidizing agent whereby the odor of the resultant treated residue is reduced.

Potassium permanganate is a preferred oxidizing agent. Ammonia or ammonium hydroxide is a preferred base and a surfactant of the anionic type is a preferred surfactant.

The residue which is the object of the process of the present invention is that obtained from the preparation of compounds having the general formula $R_yP(L)_zX_{3-y}$, wherein R is substantially hydrocarbyl, L is sulfur or oxygen, X is halogen such as chlorine or bromine, y is 1 or 2 and z is 0 or 1.

R can be alkyl, substituted alkyl, aryl or substituted aryl. It is preferred that R is substantially hydrocarbyl and by that I mean that the predominant elements in the R group are carbon and hydrogen. It is more preferred that R is hydrocarbyl $C_1$–$C_{10}$ alkyl or $C_6$–$C_{12}$ aryl.

Various methods for preparing the organophosphorus compounds of formula I are known. A compilation of compounds of formula I and methods for their preparation is found in Chapters 3 and 4 of Organophosphorus Compounds, by G. M. Kosolapoff (1956). The basic general reaction for preparation of the formula I compounds is by the reaction of a suitable organic compound with a phosphorus halide or thiohalide. The following equations will illustrate two types of this general reaction.

Type A
1. Alkyl

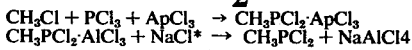

2. Aryl

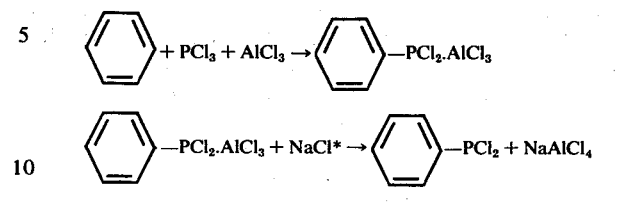

Type B $$3\ P(S)Cl_3 + C_2H_5Al_2Cl_3 \rightarrow C_2H_5P(S)Cl_2 + 2C_2H_5p(s)Cl_2 \cdot ApCl_3$$

$$C_2H_5P(S)Cl_2 \cdot AlCl_3 + NaCl^* \rightarrow C_2H_5P(s)Cl_2 + NaAlCl_4$$

* decomplexing agent

Other decomplexing agents can be used e.g. $POCl_3$. The use of $POCl_3$ is taught in Kosolapoff, cited above; sodium chloride use is taught in U.S. Pat. No. 2,986,579. Also, the Type B process is described in U.S. Pat. No. 3,558,697. The teachings in Kosolapoff, Chapters 3 and 4, as well as those in the two patents cited above are incorporated herein by reference.

The organophosphorus dihalide product is recovered from the final reaction mixture of either the Type A or B reaction by distillation. The residue remaining after this distillation contains a considerable amount of aluminum chloride/decomplexing agent reaction product, e.g. $NaAlCl_4$, as well as other P containing by-products. This residue has a very disagreeable odor. In attempting to dispose of this residue, it was first reacted with water to hydrolyze — the resultant hydrolysate was then neutralized with a base such as NaOH or KOH. However, after this hydrolysis/neutralization treatment, the disagreeable odor persisted — also, a tarry sludge was formed during the hydrolysis which made handling of the mass difficult.

It was discovered, however, that the odor was substantially reduced by (1) hydrolysing the residue with water containing surfactant and (2) neutralizing the hydrolysed residue with base in the presence of inorganic oxidizing agent. The tarry sludge formation in the hydrolysis step was also alleviated.

Surfactants of all types are useful. These include the anionic types such as soaps, sulfonated fatty alcohols, sulfonated fatty acid esters, alkyl aryl sulfonates and sodium salts of these sulfonated products and the like; cationic types such as aliphatic amines having fatty chains and their derivatives, fatty amides derived from aliphatic diamines, quarternary ammonium salts and the like; nonionic types such as condensation products of ethylene oxide and fatty alcohols or acids, reaction products of fatty acids with amino alcohols and the like; and mixtures thereof. The designation anionic, cationic and nonionic is an art recognized classification which refers to the charge, or lack thereof, on the organic portion of the surfactant molecule when it is in aqueous medium. A detailed description of surfactants and their types is contained in J. P. Sisley's, "Encyclopedia of Surface Active Agents," Volume II, p. 55–168, (1964) — and this disclosure is incorporated herein by reference.

The anionic type surfactant is preferred, with the non-soap type being most preferred.

The surfactant can also be used combined with builder. Builders cannot be exactly defined. However, they comprise classes and types of compounds which enhance surfactant properties such as wetting, foaming emulsifying and detergent power. Commonly used builders are the alkaline builders. These are, in general, alkali metal salts, usually sodium salts, of weak inorganic acids or certain organic acids. Examples of such builders are sodium carbonate, the sodium silicates, the sodium phosphates, sodium or potassium nitrilotriacetates, sodium or potassium ethylene diamine tetraacetates, alkali metal salts of phytic acid and water-soluble salts of ethane-1-hydroxy-1,1-diphosphonate. Borax is also an alkaline builder. A more detailed disclosure of builders is contained in the afrecited "Encyclopedia of Surface Active Agents" on pages 34–53 — and this disclosure is incorporated herein by reference.

The amount of surfactant which is utilized in the present process can be varied. A sufficient amount is generally used to prevent or hold tarry sludge formation in the hydrolysis step to a manageable limit. Generally up to about 2 percent by weight of surfactant can be used in the hydrolysis water. Concentrations of from about 0.01 – 1 percent by weight, preferably about 0.05 – 0.5 percent by weight can be used. These concentrations will include the builder if it is in a formulation with the surfactant. The amount of surfactant used is also dependent to a certain degree on the type of surfactant used, the amount of by-product and the type of by-product contained in the residue etc..

Oxidizing agents which are used are inorganic compounds. Examples of useful compounds are sodium hypochlorite, ferric chloride, water soluble permanganates and the like. Potassium permanganate is a preferred oxidizing agent.

Useful concentrations of the oxidizing agent range up to about 5 percent by weight based on the hydrolysate weight. Concentrations up to about 2 percent by weight are preferred — a more preferred range is about 0.1 – 1.5 percent by weight. Again the optimum amount of oxidizing agent to be used is dependent on such factors as the amount and type of by-products in the residue, the oxidizing agent used, the degree of deodorization desired, etc..

Any suitable base can be used to neutralize the residue hydrolysate. Examples of useful bases are NaOH, KOH, NH$_3$, NH$_4$OH and the like. Ammonia is a preferred base.

Sufficient base is used to at least neutralize the hydrolysate.

The following example will illustrate the process of the present invention.

Example 1

C$_2$H$_5$P(S)Cl$_2$ was prepared by the reaction of PSCl$_3$ and C$_2$H$_5$Al$_2$Cl$_3$ according to the procedure substantially as described in U.S. Pat. No. 3,558,697. The quantities of reactants used was such as to yield about 20,000 pounds of C$_2$H$_5$P(S)Cl$_2$.

After the C$_2$H$_5$P(S)Cl$_2$ was distilled off, the hot, fluid residue (temperature about 160°C) was transferred to a holding tank under N$_2$ pressure. A hydrolysis vessel was then charged with about 5,500 gallons of water and 100 pounds of a commercial detergent formulation (Orvus Hy Temp) which is believed to contain anionic surfactant mixture and alkaline builders. The mixture in the hydrolysis vessel was then circulated out of the bottom of the vessel, through a heat exchanger and then back into the top of the vessel. With the hydrolysis vessel vented to a flare, the hot, fluid residue was blown (N$_2$ pressure) into the hydrolysis vessel at a rate at which the contents of the hydrolysis vessel were maintained at below about 70°C. After the hydrolysis was completed the hydrolysate was pumped out of the hydrolysis vessel and neutralized in a mixing tee with a solution containing ammonia and potassium permanganate. The total amount of amount used was at least enough to neutralize the hydrolysate — the total amount of KMnO$_4$ added was about 600 pounds. The residue after this hydrolysis/neutralization treatment was found to be substantially odor free compared to the odor of the residue before the treatment. In addition, tarry sludge formation encountered in the hydrolysis step when no surfactant was used, was greatly reduced.

Similar results were obtained when 200 pounds of KMnO$_4$ were used in the neutralization step in Example 1. Use of NaOH in place of ammonia in the neutralization step was also effective.

The present process was also found to be effective in reducing odor of residue which remained after the removal of

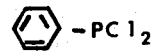

prepared according to the Type A reaction set out above.

By utilizing the deodorizing treatment disclosed above, the resultant residue can be dumped in a spoils area having to provide for or be concerned about noxious odors being emitted into the atmosphere. Furthermore, by reducing sludge formation and/or accumulation in the hydrolysis step, handling of the residue in the hydrolysis vessel and in the entire transport system is greatly facilitated.

Claims to the invention follow.

We claim:

1. A method for deodorizing the distillation residue from the preparation of organophosphorus compounds having the formula RyP(L)$_z$X$_{3-y}$, wherein R is substantially an alkyl or aryl group, L is S or O, X is halogen, y is 1 or 2 and z is 0 or 1, which comprises
    1. hydrolyzing said residue with water containing an amount of surfactant effective to retard tarry sludge formation and
    2. treating the hydrolysate from (1) with an amount of base selected from the group consisting of KOH, NaOH, NH$_3$ and NH$_4$OH, effective to at least neutralize the hydrolysate and an effective amount of inorganic oxidizing agent selected from the group consisting of sodium hypochlorite, ferric chloride, and water soluble permanganates whereby the odor of the resultant treated residue is reduced.

2. The process of claim 1 wherein said base is ammonia.

3. The process of claim 1 wherein said inorganic oxidizing agent is potassium permanganate.

4. The process of claim 1 wherein said organophosphorus compound has the formula RP(S)X$_2$.

5. The process of claim 1 wherein said organophosphorus compound has the formula RPX$_2$.

6. The process of claim 1 wherein said surfactant in anionic, said base is ammonia and said inorganic oxidizing agent is potassium permanganate.

7. The process of claim 6 wherein said organophosphorus compound has the formula RP(S)X$_2$.

8. The process of claim 7 wherein said organophosphorus compound is $C_2H_5P(S)Cl_2$.

9. The process of claim 6 wherein said organic compound has the formula $RPX_2$ wherein R is selected from $C_1$–$C_6$ alkyl and $C_6$–$C_{10}$ aryl.

10. The process of claim 6 wherein said water additionally contains alkaline builders.

11. The process of claim 10 wherein said organophosphorus compound has the formula $RP(S)X_2$.

12. The process of claim 11 wherein said organophosphorus compound is $C_2H_5P(S)Cl_2$.

13. The process of claim 1 wherein said organic compound is a hydrocarbon or halohydrocarbon and the coreaction is carried out in the presence of an aluminum halide catalyst.

14. The process of claim 1 wherein said organic compound is an alkyl or aryl aluminum compound.

15. The process of claim 1 wherein said organic compound is an alkyl or aryl mercury compound.

* * * * *

UNITED STATES PATENT AND TRADEMARK OFFICE
CERTIFICATE OF CORRECTION

PATENT NO. : 3,929,637
DATED : December 30, 1975
INVENTOR(S) : Albert E. Appleby et al It is certified that error appears in the above–identified patent and that said Letters Patent are hereby corrected as shown below:

Column 2, line 1, the formula:

"$CH_3Cl + PCl_3 + ApCl_3 \longrightarrow CH_3PCl_2 \cdot ApCl_3$"

should read

-- $CH_3Cl + PCl_3 + AlCl_3 \longrightarrow CH_3PCl_2 \cdot AlCl_3$ --

Column 2, line 14, after second plus (+) the formula:

"$2C_2H_5p(s)Cl_2 \cdot ApCl_3$" should read -- $2C_2H_5P(S)Cl_2 \cdot AlCl_3$ --

Column 2, line 15, after the arrow ($\longrightarrow$) the formula:

"$C_2H_5P(s)Cl_2$" should read -- $C_2H_5P(S)Cl_2$ --

Column 4, line 64 (Claim 6), after "surfactant", "in" should be -- is --

Signed and Sealed this first Day of June 1976

[SEAL]

Attest:

RUTH C. MASON
Attesting Officer

C. MARSHALL DANN
Commissioner of Patents and Trademarks